Sept. 7, 1965 R. J. SCHWINGHAMER 3,204,889
SPACE VEHICLE ELECTRICAL SYSTEM
Filed Aug. 10, 1962 4 Sheets-Sheet 1

ROBERT J. SCHWINGHAMER
INVENTOR.

BY

ATTORNEYS

ROBERT J. SCHWINGHAMER,
*INVENTOR.*

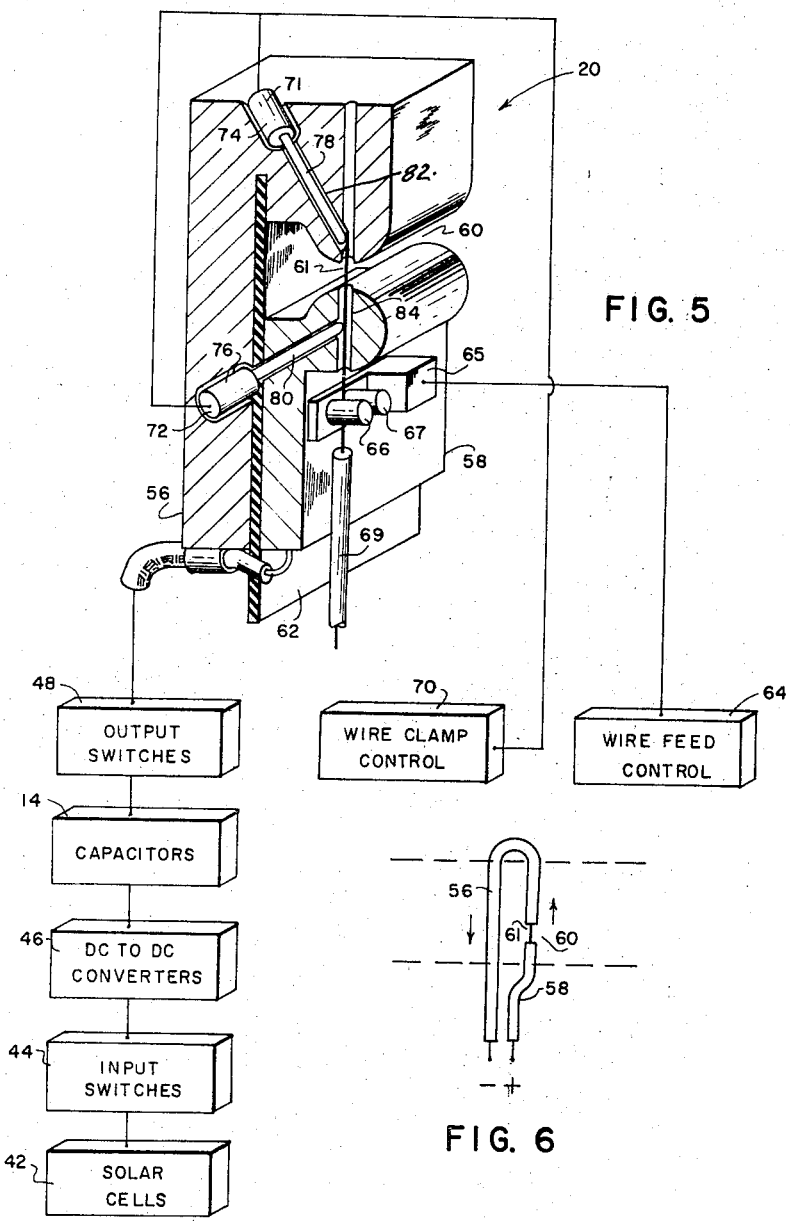

United States Patent Office 3,204,889
Patented Sept. 7, 1965

3,204,889
SPACE VEHICLE ELECTRICAL SYSTEM
Robert J. Schwinghamer, Huntsville, Ala., assignor to the United States of America as represented by the Administrator of the National Aeronautics and Space Administration
Filed Aug. 10, 1962, Ser. No. 216,711
7 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates to electrical systems and particularly to an electrical power system adapted for employment with space flight vehicles which must operate over extended periods.

Due to size, weight, environmental and other considerations, power systems normally employed in flight vehicles are often ill-fitted for space vehicle operations. This has become particularly so with respect to certain projected vehicles which will in the future not only depend upon a supply of electrical energy for supplying varying needs within the vehicle, but will, in many instances, be electrically propelled. Further, it is contemplated that such electrical needs may extend over periods of months, or even years in the case of interplanetary travel.

Conscious of the need for long range, long period propulsion systems, much work has been done to develop electrical propulsion systems, which, as in the case of ion propulsion engines, provide high specific impulse and thus high fuel efficiency. A problem which persists as this work goes forward, however, is that of a power source to sustain electrical engines in prolonged flight. A still broader problem is that of the need of a new concept in space vehicle electrical systems as a whole in view of the fantastically different environment in which space vehicles must operate and within which vehicles men must live and work. Perhaps the most discussed of the personal environmental problems faced, is that of weightlessness demonstrated by astronauts in orbital travel. In the future it is anticipated that these men will be expected to perform a variety of repair and construction tasks as, for example, will be involved in assembly of space stations. One of the most promising new approaches for fastening, drilling and metal working in general, which is compatible with an operators weightlessness, employs electro-magnetic tooling to obtain torqueless and low average thrust reaction effects in general. Such tooling however, requires a special high voltage, low impedance power source. Another device which most probably will be standard equipment in space vehicles and which has a similar electrical requirement is the laser for use in space communications, ranging and direction finding. Pulse radar has a similar requirement which is normally met by a special high voltage power supply for the radar equipment alone.

It is the object of this invention to provide a new unified solution to the problem of space vehicle electricity and electrical systems. A further object of this invention is to provide a compatible power source-power propulsion system which will propel a space vehicle on a self sustaining basis over extended periods.

Briefly, the above and other objects of the invention are obtained by the novel fabrication of a space vehicle in which the outer skin and other structural elements are of an integral construction which includes a plurality of metal sheets separated from other structures by a high value (in excess of 100) dielectric constant material forming a plurality of discrete capacitors. A high voltage (on the order of 4,000–20,000 volts) charging means, such as solar cells driving a low voltage to high voltage D.C. to D.C. converter, is connected through switching means to any desired number of capacitors. Provisions are also made for inter-coupling the capacitor outputs to the different electrical utilization or load circuits (engine, power tools, communications equipment, etc.), of the vehicle. Further, in accordance with one feature of the invention, the space vehicle includes, as its propulsion means, an electrical engine particularly adapted for pulse or intermittent type operation, a type operation most compatible with the power source. As a still further feature of this invention the engine consists of a metal exploding assembly such as would explode a wire, and which when powered with the low impedance high current capability of the power supply just described, is capable of delivering bursts or pulses of power at the million watt level or greater.

For a better understanding of the invention, reference is made to the following detailed description of a representative embodiment of the invention and the accompanying drawings in which:

FIGURE 5 is a perspective view, partly in section, of an exploding wire electrical propulsion engine of the power system of this invention; and FIGURE 6 is an electrical diagram representative of features of the engine shown in FIGURE 5.

Figure 1:
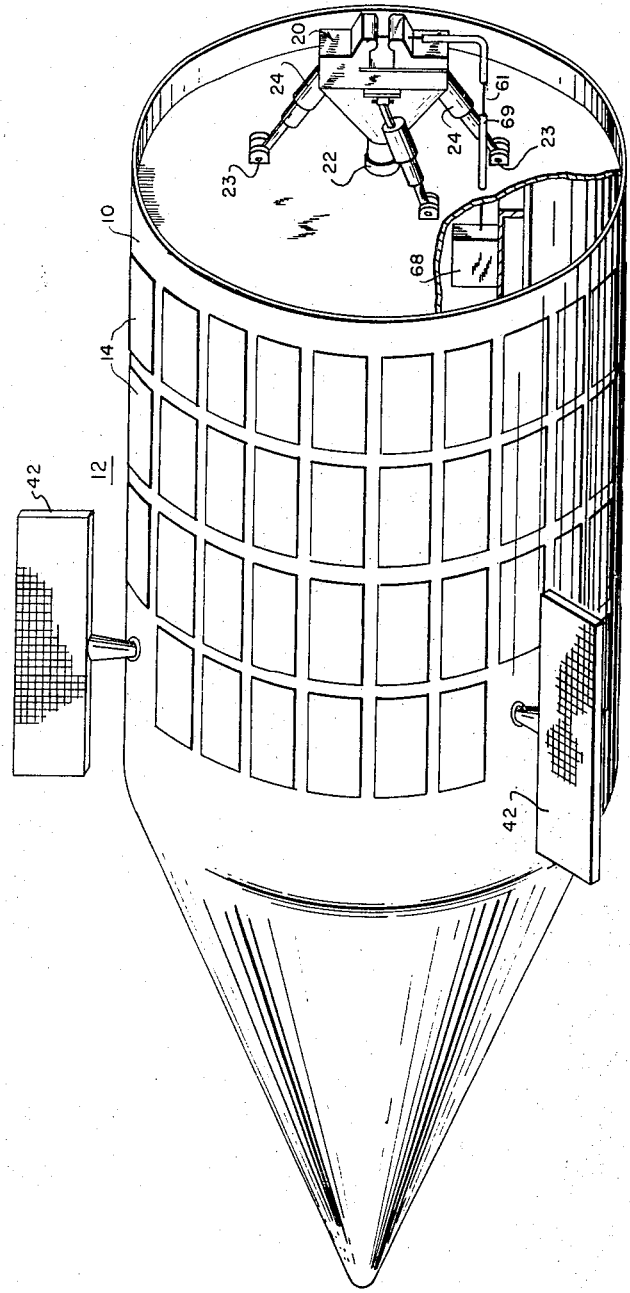
FIGURE 1 is a perspective view showing the arrangement of certain elements of the power system of this invention.
Figure 2:
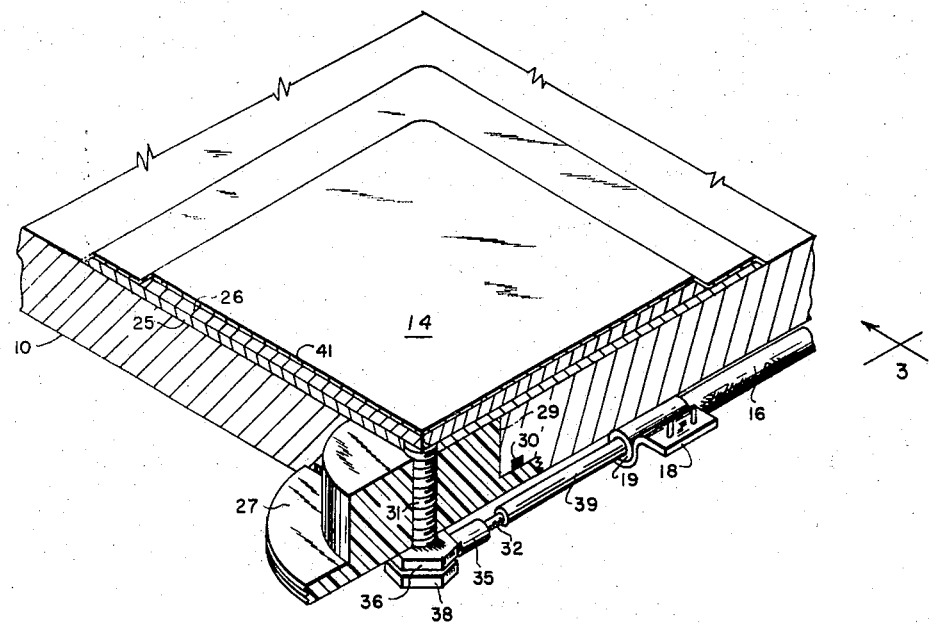
FIGURE 2 is a perspective view illustrating the integral capacitor-vehicle construction of this invention.
Figure 3:
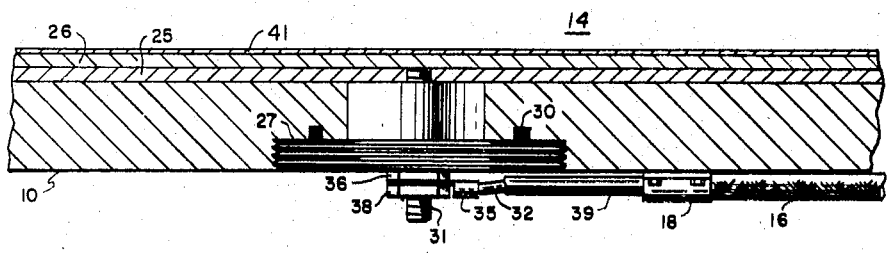
FIGURE 3 is a sectional view of the capacitor construction shown in FIGURE 2 along the lines 3—3.

Referring now to the drawings, particularly FIGURES 1–3, metal skin covering 10 of space vehicle 12 is employed to form integral capacitors 14 which have electrical inputs and outputs provided by coaxial cable 16 positioned on the inner side of the vehicle by clamps 18 which electrically and physically connect the outer conductor 19 of each cable 16 to skin covering 10. Exploding-wire engine 20 is swivel mounted on the after end of vehicle 12 by means of a ball joint (not shown) at point 22 and is pivot mounted at points 23 by servo assemblies 24 which include means to adjust the attitude of engine 20 with respect to the body of the vehicle through conventional means. Each mounting point is insulated, electrically, from the vehicle body.

Capacitors 14 are formed, for example, by affixing a dielectric 25, a barium titanate base dielectric, material on basic metal skin covering 10 by an epoxy adhesive. In this manner a very high dielectric constant (in excess of 1000) is obtained which will withstand relatively high capacitor plate voltages. As employed in this application the expression relatively high voltages refers to the range of approximately 4 to 20 thousand volts.

A conductive outer plate 26 of capacitor plate 14 is formed for example by spraying a metal coating, e.g. tantalum, on dielectric coating 25 after the surface of coating 25 has been glass frittered. Teflon plug 27 mounted by means of knurled or threaded perimeter 28 in an opening 29 in the vehicle skin covering 10 and sealed by, for example, a buna "N" O ring seal 30, provides an insulating support for an electrical conductor in the form of brass feed-through stud 31. Stud 31 passes from the inside of vehicle 12 to the outside and connects to the outer capacitor plate 26 of capacitor 14 while effectively sealing off the interior from space vacuum. On the inside, feed-through stud 31 is electrically connected to the center conductor 32 of coaxial cable 16 by means of lug 35 held on stud 31 by nuts 36 and 38. The outer conductor 19 of coaxial cable 16 is separated from the inner-conductor 32 by a polyethylene insulating layer 39. In order to achieve a very low inductance, and thus high surge currents from capacitors 14, a special, but commercially available cable of the type in which inner-conductor 32 has a center filled with polyethylene. The conductive outer plate 26 of capacitors 14 is in turn coated with a synthane or similar material layer 41 for protection against vaporizing due to aerodynamic heating. However, in using tantalum as an outer plate which has a low vapor pressure, in many instances coating layer 41 is not necessary.

Figure 4:
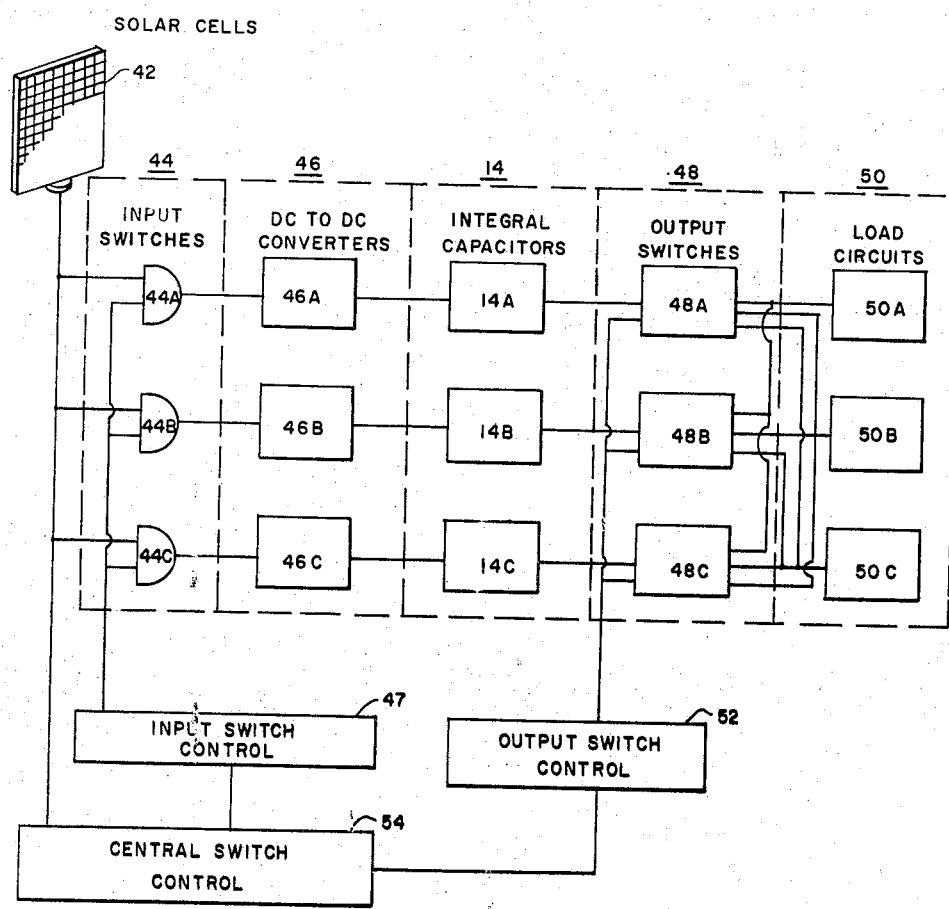
FIGURE 4 is an electrical block diagram of an embodiment of the invention.

Referring now additionally to FIGURE 4, solar cells 42, which are shown mounted about vehicle 10 at 120° intervals, provide a source of current which is selectively furnished by input switches 44 to direct current (D.C.)-to-direct current (D.C.) converters 46. D.C. to D.C. converters 46 receive the relatively low voltage output of solar cells 42 and convert it by conventional means to a relatively high voltage, 4,000 to 20,000 volts. Switches 44 are remotely controlled by input switch control 47 which includes means for selectively closing one or more switches 44 connecting one or more banks of solar cells 42 to one or more D.C. to D.C. converters 46. In one form, input switch control 47 is a simple manual selector switch which closes the circuit to appropriate switches 44. The output of D.C. to D.C. converters 46 is applied to integral capacitors 14 for storage. When capacitors 14 the charged the output is available through output switches 48 to any one or more of space vehicle load circuits 50. As illustrated in FIGURE 4 each of the functional units (mounted in vehicle 12 in a manner not shown) has three each of the basic elements required by the particular function. Thus, charging switches 44 are made up of charging switches 44A, 44B and 44C; D.C. to D.C. converters 46 comprise converters 46A, 46B and 46C and this same pattern prevails through discrete capacitors 14, output switches 48 and load circuits 50. Only three units of each functional unit are shown; however, there is no limitation upon the number of each imposed by the invention. This depends upon the size of the vehicle, and thus the area available for discrete capacitors, and the load circuits to be employed.

Output switches 48 are controlled by output switch control 52, which together with input switch control 47, is controlled by central switch control 54. Switch control 54 is automatically or manually operated and as manually operated provides, for example, control voltages for energizing, through input switch control 47 and output switch control 52, switches 44 and 48. As an automatic control, switch control 54 provides means for monitoring the charge on each capacitor 14 and means to provide input switching control to affect input switch control 47 to accomplish the desired level of charge on each capacitor. Similarly, load circuits 50 are monitored by central switch control 54 which directs the functioning of output switch control 52 in its control of individual output switches 48, and thereby the flow of current from particular capacitors 14 to particular load circuits 50. Conventional sensing, switching and logic circuitry is employed throughout switches 44 and 48 and controls 47, 52 and 54 and is based upon the charging sources available and particular loads which make up load circuits 50.

Referring now additionally to FIGURES 5 and 6, the exploding wire engine of the power system of this invention comprises basically an inverted U shaped conduction path as electrically illustrated in FIGURE 6 and physically illustrated in FIGURE 5. The essential feature of the shape is to provide the adjacent but opposite direction conduction paths as illustrated by the leg portions of the U between the dashed lines of FIGURE 6. One electrode 56, negative as shown, forms a portion of the inverted U corresponding approximately to the shape of a J, inverted and reversed. The balance of the U shape is made up of positive back strap electrode 58 separated from negative electrode 56 by gap 60. A tungsten metal-wire 61, of a cross section which is small compared to the electrodes, is fed into gap 60, and exploded. Backstrap electrode 58 is separated from electrode 56 by insulator 62, the three being attached together. The significance of the U shaped configuration as shown, and the position of the gap in one leg of the U, opposite the other leg of the U, is to produce a high repulsive force between the interaction of the magnetic field created by the current in the backstrap (electrode 56) and the current in the plasma in the inter-electrode gap. The resulting repulsive forces existing between the legs of the U readily achieve acceleration of the plasma created by the electrical explosion of wire 61, as will be discussed below. Gap 60 is adjusted to provide a gap length (e.g. 1 inch) which is smaller than gap width to achieve a relatively uniform field. The distance between wire 61 at the point where it bridges the electrodes and electrode 56 is held to a minimum, being just sufficient to prevent burning of insulator or insulating member 62 which, as illustrated, provides an electrical and heat insulating facing for electrode 56 between electrode 56 and wire 61. This minimum distance which necessarily places insulator 62 and wire 61 closely adjacent, in practice is on the order of a fraction of a centimeter (e.g. ½ centimeter) or so.

To examine the operation of engine 20 assume first that wire feed control 64 (a conventional motor control which is located, in a manner not shown, within the vehicle) turns on feed motor 65 for the period necessary for feed motor 65 driving rollers 66 and 67 to advance wire 61 to the position shown in which wire 61 bridges the gap between electrodes 56 and 58. Wire 61 is supplied from a wire storage source 68, FIGURE 1, such as an enclosed reel mounted within the vehicle, through a tubular casing 69. Wire clamp control 70 (an electrical switch also located, in a manner not shown, within the vehicle) is then employed to energize solenoids 71 and 72 of wire clamp assemblies 74 and 76 which causes stem armatures 78 and 80 to clamp wire 61 against the walls of passageways or channels 82 and 84 of electrodes 56 and 58 through which wire 61 is fed. Clamping occurs at points adjacent the gap between electrodes 56 and 62.

With capacitors 14 having been previously charged by D.C. to D.C. converter 46 through input switches 44 from solar cells 42, output switches 48 are closed under the control of central control 54 and output switch control 52 (both switch controls being located in the vehicle in a manner not shown) and a potential of between 4,000 and 20,000 volts is applied across gap 60 through wire 61 and electrodes 56 and 62. Due to the inherent low impedance of the circuit completed, capacitors 14 through coaxial cable 16, current having peak values in the range of from several hundred thousand amperes to over a million amperes flows through wire 61. The result is that wire 61 explodes creating a conductive plasma between electrodes 56 and 58. Conventional current flow, or conduction through the plasma, is in a direction from electrode 58 to electrode 56, and the repulsive fields which result interact to expel the plasma in a very high velocity pulse. With regard to a particular wire size as a source of plasma, tests indicate that in general, smaller wire sizes yield the greater specific impulses and greater efficiency. This, of course, must be reconciled with a lower resulting thrust.

In order to demonstrate the overall effectiveness of an embodiment of this invention, a series of equations are set forth hereinafter. For purposes of illustration, the space vehicle of an embodiment of the invention is assumed to be of moderate size having a useable surface area of approximately 450 ft. sq.

The equation for total capacitance is:

$$C = .224 \frac{KA \times 10^{-6}}{d}$$

$$C = .224 \frac{2500(64.8)10^3 \times 10^{-6}}{.05}$$

$$C = 726 \ \mu f.$$

Where:

$K$=dielectric constant=2500 such as Alsimag T-158-A
$A$=plate area in in.$^2$=64.8×10$^3$ in.$^2$
$d$=plate spacing in inches=.050 inch
$\mu f.$=capacitance in microfarads The approximate energy W available from this capacitance is:

$$W = \tfrac{1}{2} CV^2$$
$$W = \tfrac{1}{2}(726 \times 10^{-6})(5000)^2$$
$$W = 9000 \text{ joules}$$

Where:

$V$=voltage across capacitors=5000 volts

The system resonant frequency $F_r$ during conduction is approximately:

$$F_r = \frac{1}{2\pi\sqrt{LC}}$$

$$F_r = \frac{1}{2\pi\sqrt{.03 \times 10^{-6} \times 726 \times 10^{-6}}}$$

$$F_r = 34 \text{ kc.}$$

Where:

$L$=approximate inductance of discharge circuit=.3 $\mu h$.
kc.=kilocycles
$\mu h.$=microhenries The approximate total impulse $I_t$ imparted to a 1 centimeter length of plasma during one-half cycle of an oscillation of the discharge:

$$I_t = \frac{h_0 \pi F_r V^2 C^2 10^3}{2r}$$

$$I_t = \frac{(4\pi \times 10^{-7})\pi(34 \times 10^3)(5000)^2(726 \times 10^{-6})^2(10^3)}{2(.025)}$$

$$I_t = 35{,}400 \text{ dynes sec.}$$

Where:

$h_0$=vacuum permeability=$4\pi 10^{-7}$
$r$=distance between electrodes 56 and wire 61=.025 meter The approximate specific impulse $I_{sp}$ is:

$$I_{sp} = \frac{I_t}{mw}$$

$$I_{sp} = \frac{35{,}400}{.0083(980)}$$

$$I_{sp} = 4354$$

Where:

$m$=weight of tungsten wire between electrodes=.0083 gram
$I_{sp}$=grams of thrust developed per gram of wire consumed per second
$w$=conversion factor to dynes=980

This value of specific inpulse was obtained using a value of capacitor voltage near what has been determined a near minimum value for efficient overall operations, 5000 volts, considering a general operating range of from 4000 to 20,000 volts. Further the energizing source for the propulsion expends no mass, being from the sun through solar cells 42; and, power storage is accomplished at a fraction of the weight normally required, as where batteries are employed.

Obviously, many other modifications and variations of the present invention are possible in the light of the above teachings. It is, therefore, to be understood that within the scope of the appended claims the invention may be practiced other than as specifically described. While solar cells present an attractive energy source, due to no expenditure of mass fuel cells, nuclear power plants, or any conventional methods can supply the relatively low mean, or average, power for charging the integral elements.

What is claimed is:

1. A flight vehicle electrical power system comprising:
   (A) electrical capacitor storage means,
      (1) one electrical plate of said storage means comprising metal structural surfaces of said vehicle,
      (2) a dielectric means comprising a material having a high dielectric constant covering between said surfaces,
      (3) a second electrical plate of said storage means comprising a metallic coating over said dielectric covering;
   (B) charging means connected to said capacitor storage means for charging said capacitor storage means to a relatively high voltage;
   (C) output switching means connected to said capacitor storage means; and
   (D) electrical power utilization means connected through said output switching means to said storage means.

2. The power system set forth in claim 1 wherein said charging means comprises solar cells and conversion means connected to the output of said solar cells for providing said relatively high voltages.

3. The power system set forth in claim 2 wherein at least one power utilization means comprises propulsion means responsive to current from said capacitor storage means for electrically producing pulses of thrust.

4. The power system set forth in claim 3 wherein said propulsion means comprises:
   (A) first and second electrodes connected through said output switching means across the electrical output of said capacitor storage means;
   (B) means for positioning a length of electrically shorting material across a gap between said electrodes which shorting material has a cross section small with respect to said electrodes.
   (C) switch control means connected to said switching means for actuating said output switching means whereby the output of said capacitor storage means is applied across said electrodes and through said shorting material to explode said shorting material.

5. The power system set forth in claim 4 wherein said electrodes and said shorting material together approximate in part a U shape configuration with said shorting material forming a portion of one leg of the U shape.

6. The power system set forth in claim 5 further comprising an insulating member separating said electrodes and supporting said second electrode on said first electrode and said insulating member separating said shorting material from the leg portion of said U shape opposite said shorting material and said shorting material is closely adjacent said insulating member.

7. The power system set forth in claim 6 wherein:
   (A) said electrodes: have passageways aligned for the travel of said shorting means between and through said electrodes;
   (B) said shorting means comprises a metal wire;
   (C) a storage source of said wire;
   (D) wire feed means for feeding said wire from said source through said passageways;
   (E) wire clamping means supported by said electrodes for clamping said wire against said electrodes adjacent said gap.

References Cited by the Examiner

UNITED STATES PATENTS 2,975,332   3/61   Starr ---------------- 60—355 X

FERGUS S. MIDDLETON, *Primary Examiner.*